(12) United States Patent
Sakai

(10) Patent No.: US 7,752,114 B2
(45) Date of Patent: Jul. 6, 2010

(54) AUCTION METHOD, AUCTION SYSTEM, AND PROGRAM PRODUCT THEREFOR

(75) Inventor: Hideo Sakai, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 2298 days.

(21) Appl. No.: 10/105,133

(22) Filed: Mar. 21, 2002

(65) Prior Publication Data
US 2002/0138405 A1 Sep. 26, 2002

(30) Foreign Application Priority Data
Mar. 21, 2001 (JP) .............................. 2001-080584

(51) Int. Cl.
*G06Q 40/00* (2006.01)
(52) U.S. Cl. .......................................... 705/37; 705/35
(58) Field of Classification Search .................. 705/37, 705/35
See application file for complete search history.

(56) References Cited

U.S. PATENT DOCUMENTS

| | | | | |
|---|---|---|---|---|
| 5,333,257 A | * | 7/1994 | Merrill et al. ................ | 345/467 |
| 5,408,417 A | * | 4/1995 | Wilder ........................... | 705/5 |
| 5,797,126 A | * | 8/1998 | Helbling et al. ................ | 705/5 |
| 6,023,685 A | * | 2/2000 | Brett et al. ..................... | 705/37 |
| 6,167,386 A | * | 12/2000 | Brown .......................... | 705/37 |
| 6,260,024 B1 | * | 7/2001 | Shkedy ......................... | 705/37 |
| 7,003,485 B1 | * | 2/2006 | Young .......................... | 705/37 |
| 2002/0082969 A1 | * | 6/2002 | O'Keeffe et al. .............. | 705/37 |
| 2003/0093355 A1 | * | 5/2003 | Issa ............................. | 705/37 |

FOREIGN PATENT DOCUMENTS

| JP | 09-044570 | 2/1997 |
|---|---|---|
| WO | 00-08678 | 2/2000 |

OTHER PUBLICATIONS

Olp, Susan. "Metra, Bair Modernize Ticket System". The Billings Gazette. Billings, Mont: Apr. 30, 1999. p. 18. (2 pages).*
"Learn About Buy It Now", [online], [retrieved Jan. 4, 2007]. Retrieved from the Internet <URL:http://web.archive.org/web20010203235600/http://pages.ebay.com/services/buyandsell/buyitnow.html> (6 pages).*

* cited by examiner

*Primary Examiner*—James P Trammell
*Assistant Examiner*—Elda Milef
(74) *Attorney, Agent, or Firm*—David Mims; Mark P Kahler

(57) ABSTRACT

A seat ticket auction method and system using the Internet is provided. A user submits a tender for the auction of each seat while referring to a seating table, and also performs a search of an exhibition before submitting a tender during the auction. Further, when the seating table is referred to, information for a seat appropriate for a person in a wheelchair, and a simulation (view) of what a user will see of the stage from a seat are displayed on the terminal of the user. Three tender types, a personal tender, a complete group tender and an incomplete group tender can be selected. For the complete group tender, when a bid is not successful for all the members of the group, the bid is abandoned.

2 Claims, 6 Drawing Sheets

AUCTION METHOD, AUCTION SYSTEM, AND PROGRAM PRODUCT THEREFOR

DETAILED DESCRIPTION OF THE INVENTION

1. Field of the Invention

The present invention relates to an auction method and an auction system using a computer system or a computer network, and in particular to an auction technique for reserved seat tickets, such as those for concerts for which the admission prices fluctuate, depending on the seat locations.

2. Background Art

Ordinarily, for events such as concerts or plays, the sale of reserved seat tickets is handled by vendors who sell the tickets over the counter or by telephone. And usually, a classification system is employed whereby, dependent on their locations, seats are assigned grades, such as S, A and B, so that they can be purchased at predetermined prices without their specific locations having to be designated. That is, for a certain exhibition, a purchaser who requests two S tickets, for example, can obtain them if two vacant seats are still available. And when circumstances permit it, purchasers can select the seats they desire. Generally, however, since tickets are allocated to individual vendors, the ranges within which purchasers can select seats are limited.

As a result of the development of communication techniques for the use of computer systems and computer networks, such as the Internet, for example, auction sales held via the Internet have become popular. Generally, when a target product is exhibited for sale by auction, a predetermined period of time is set during which many and unspecified bids may be tendered. Then, upon the expiration of the time period, the sale is declared complete and the highest bidder is determined to be the successful purchaser. When an Internet sale by auction is held, using a computer system and the Internet, goods are displayed, bids are submitted, and, upon the expiration of a set time period, the identity of a successful bidder is determined.

PROBLEMS TO BE SOLVED BY THE INVENTION

So long as concert tickets can be easily obtained, no large problems arise. However, the purchase of tickets for a popular exhibition often involves excessive labor on the part of the purchasers, who are forced to queue up at sales counters for many days, or must place repeated telephone calls to secure reservations. Further, when tickets to a popular event are in short supply, the so-called scalping of tickets becomes a problem. The scalpers who engage in this activity, which generally is illegal and regulated by law, take advantage of the relative rarity of eagerly sought-after tickets to charge third parties prices that are much higher than those at which the tickets originally sold. Actually, any profit gained by scalping tickets should by rights belong to the promoter of an event, and in any case, this activity imposes an excessive load on purchasers that they should not have to bear.

Purchasers also may have a variety of demands, e.g., a request for presenting flowers to entertainers, a request that they may be permitted to concentrate on a play without worrying about audience members passing by along the aisle, or a request for, among seats S, a seat at the center of a stage. Thus, the location of a desired seat varies depending on what is requested.

Eventually, the prices paid for reserved seat tickets vary due to differences in the amenities demanded and the desires of individual purchasers. Initially, specific prices for the sale of tickets are set by a promoter or a vendor, and although these prices, depending on the individual, may at first be regarded as being expensive or reasonable, if, for example, a production is popular and tickets are difficult to acquire, many purchasers may be so intent on obtaining tickets that they will purchase them, at whatever the cost and regardless of whether they pay more than the regular prices. Under these circumstances, there is a good probability that incidents of the above described scalping will occur.

Further, even if a purchaser can actually select a seat, imagining how the stage will appear from that seat is difficult. If the purchaser has perhaps visited the hall (theater) many times, the experiences will provide a good idea of what to expect; however, if the purchaser has never visited that theater, he or she will have no idea of what the view will be like until actually seated.

In addition, none of the regular seats will adequately suffice for a person who must use a wheelchair, and who will naturally desire a location adjacent to an aisle. Thus if measures have been taken to ensure the theater (hall) can properly accommodate such individuals, it would be convenient were this seating information be made readily available when a ticket is purchased.

Therefore, one object of the present invention is the provision of improved convenience for ticket purchasers, while removing inconveniences, such as queuing up at a counter for a long time, or making repetitive calls to obtain a reservation. It is another object of the present invention to provide a system for preventing illegal activities, such as ticket scalping, and for returning a fair profit to the correct persons. It is an additional object of the present invention to provide a system and a method for selling a seat ticket at a price that reflects, for each user, a need that differs that of others. It is a further object of the present invention to provide a system and a method for providing the maximum profit for a promoter or a ticket vendor. It is a still further object of the present invention to provide, at the time of purchase of a ticket, more information a user can employ to easily determine the value of a seat.

SUMMARY OF THE INVENTION

The schematic configuration of the present invention will now be described. According to the present invention, a seat ticket auction method and system using the Internet is provided. A user can submit a tender for the auction of each seat while referring to a seating table, and can also perform a search of an exhibition before submitting a tender during the auction. Further, when the seating table is referred to, information for a seat appropriate for a person in a wheelchair, and a simulation (view) of what a user will see of the stage from a seat can be displayed on the terminal of the user. Three tender types, a personal tender, a complete group tender and an incomplete group tender can be selected. For the complete group tender, when a bid is not successful for all the members of the group, the bid is abandoned. When the highest price that is determined in advance is presented, the person who presented that bid is determined to be a successful bidder, without waiting until the tender period expires. Further, instead of offering a tender for each seat, a so-called Dutch auction can be performed whereby a tender is offered for multiple seats as a single unit, i.e., a collective offer made for multiple seats.

According to the invention, a reserved seat ticket can be purchased at the highest price agreed on by each purchaser in accordance with the needs of the purchaser. Thus, the maximum profit can be provided for a promoter or a ticket vender. Further, the chance that a ticket scalper will interfere can be removed. In addition, a purchaser need not queue up at a counter to purchase a ticket, or repetitively make calls for a reservation, and can designate a seat location and purchase a desired reserved seat ticket. Furthermore, since the auction is employed, a user can obtain a ticket at a price that the user considers reasonable. That is, the value of a seat can be determined in accordance with the needs of the user.

Further, the purchaser can easily obtain a variety of information for making a determination concerning a tender (determining a purchase). That is, effective information required to determine the value of a seat, such as information as to whether the seat is appropriate for a user in a wheelchair, and the view of the stage from the seat, can be more easily be obtained.

In addition, according to the invention, since a group tender can be offered, reserved seat tickets sought by a group can be purchased. Furthermore, since a complete or an incomplete group tender can be offered, the details of the needs of a purchaser, such as the intent that tickets will not be purchased when seats are not available for all the members, are not available, or the intent that seat tickets will be purchased even if they are available only for part of members, can be responded to.

Furthermore, since a highest price is set and an individual tendering this price is determined to be the successful bidder, an abnormal rise in the tender price can be avoided. And since the Dutch auction is employed, the differences in the prices of the seats can be suppressed and the inequalities existing among users can be reduced.

Preferred Embodiments

The preferred embodiments of the present invention will now be described in detail while referring to the accompanying drawings. It should be noted that the present invention can be implemented by various other embodiments, and is not limited to the embodiments of the invention. Furthermore, the same reference numerals are used through the embodiments to denote corresponding components.

In these embodiments, the method and the system will mainly be described. However, as will be apparent to one having ordinary skill in the art, the present invention can be implemented as a computer-readable program. Thus, the present invention can be provided by hardware, software or a combination of hardware and software, and the program can be recorded on an arbitrary computer-readable storage medium, such as a hard disk, a CD-ROM, an optical storage device or a magnetic storage device.

Further, in the embodiments, a general computer system can be employed. The computer system used for this embodiment comprises hardware resources common to average computer systems, i.e., a central processing unit (CPU), a main memory (RAM), a nonvolatile memory (ROM), a co-processor, an image accelerator, a cache memory and an input/output controller (I/O). The computer system further comprises an external memory, such as a hard disk drive, and communication means that can be connected to a network, such as the Internet. The computer system can be an arbitrary computer, such as a personal computer, a workstation or a mainframe computer.

FIG. 1 is a conceptual diagram showing an example auction system according to one embodiment of the present invention. In this auction system, a computer system 2 of a ticket purchaser and a server 3, including an auction site, are connected to the Internet 1. The ticket purchaser issues various requests via the Internet 1 to the server 3, and the server 3 transmits responses via the Internet 1 to the computer system 2 of the ticket purchaser. Well known browser software is installed in the computer system 2, and an HTTP (Hypertext Transfer Protocol) request, for example, is issued to the server 3. The server 3 performs various processes, as will be explained below, and transmits, as a response, HTML (Hypertext Markup Language) data or dynamic HTML or XML (Extensible Markup Language) data.

In this embodiment, the Internet 1 is employed; however, the use of the Internet is not always necessary. For example, the computer system 2 and the server 3 may be connected by a special line. The Internet 1 may be an intranet used by a company, and the communication means for the Internet 1 may be either wired or wireless.

The server 3 includes an exhibition catalogue system 4, a seating table system 5, a seat auction system 6, an accounting system 7 and a ticket delivery system 8.

The exhibition catalogue system 4 can search for an exhibition, such as a concert, a play or a movie, by using the date, a hall name, an event, performer names, the presence/absence of reserved seats and the period for an auction. For each exhibition, the exhibition catalog system 4 provides information as to events, performers, dates, a hail, seat types, and the period of an auction. Further, for each exhibition, a pertinent seating table is correlated with a seat auction system.

An exhibition search engine 9 is used for the search. The exhibition search engine 9 refers to an exhibition database 20. Data concerning the exhibitions are stored in the exhibition database 20, and one record 24 includes, for example, "exhibition name", "date", "hall", "ticket sale schedule" and "seating table identifier". The "seating table identifier" is an identifier used to correlate the exhibition and the seating table.

The seating table system 5 displays a seating table for a selected exhibition and the classification of seats (seats for an auction sale, free seats, invitational seats, etc.). A seat display module 10 is used to display seats, and to display the seating table, information such as the current bid conditions and the characteristics (the visual aspect, the acoustic aspect and the preference) of each seat is provided. A seat condition management module 12 is used to display the bid conditions and relevant information. The seating table system 5 may provide a view of the stage from each seat by using a computer simulation. A seat simulator 11 is used for the simulation. The seating table system 5 correlates a selected seat or a set of seats with the auction.

The seat display module 10, the seat simulator 11 and the seat condition management module 12 refer to the seat database 21. The data concerning a seat is stored in the seat database 21, and one record 25 includes, for example, "seating table identifier", "seat identifier", "seat position", "seat information", "seat auction identifier" and "seat condition". The term "seat position" is used not only for the seat display, but also as position information for simulating the visual and acoustic aspects of the seat. The "seat information" includes information as to whether a seat is appropriate for a user in a wheelchair, or other information concerning the characteristics of a seat. The "seat auction identifier" is used to correlate a seat and the seat auction system. The "seat condition" indicates the current action condition, and stores, for example, the number of bids and the highest bid price.

Based on the seating table, the seat auction system 6 discloses the auction conditions (not yet tendered, tendered, or successfully tendered) for the individual seats, and accepts a tender for each seat. In the auction of this embodiment, three tenders are accepted, i.e., a purchase by an individual, a purchase by a complete group unit, or a purchase by an incomplete group unit.

A purchase by the unit of an individual is a form whereby a tender is submitted for one seat, without being associated with other seats. A purchase by the unit of a complete group is a tender form whereby the purchase of tickets is desired only when multiple seats are available for all the members of a group, such as family members. While a tender (successful bid) can not be canceled for a general auction, for a purchase by a group unit, it is assumed without any penalty that no tender was offered, when all the seats for which tenders were submitted, for the complete group are not available. A purchase by the unit of an incomplete group is a tender form whereby available multiple seats are purchased even when seats for all the members are not available. The group members may be designated by a purchaser, or a provider may group seats for a family or a couple, for example, and provide the seat groups for an auction.

When the tender period has expired, the seat auction system 6 determines the successful bidder. It should be noted that the successful bid determination engine 13 is used for this determination.

The seat auction system 6 includes a tender confirmation mail gateway 14, an outbid notification mail gateway 15 and a successful bit notification mail gateway 16. When a tender is accepted, the tender confirmation mail gateway 14 transmits a confirmation mail to a designated mail address. When the successful bidder is determined, the outbid notification mail gateway 15 and the successful bit notification mail gateway 16 send the tenderers e-mails to indicate the bidding results (outbid or bidding success). The bidding results are also displayed on a web site. For the tender, an upper limit successful bid price may be provided, so that the successful bidder can be determined at the time that price is tendered. Likewise, when the lowest successful bid price is provided and when the tender price does not reach that price by the end of the auction, the same process as for the normal tendering process, or when no tender is offered, may be performed. A seat for which a tender was not accepted by the end of an auction can be provided again for another auction, or can be sold by another method, such as being sold over the counter or on the day of the performance.

The seat auction system 6 examines the seat auction database 22, and the record 26 for the seat auction database 22 includes, for example, "seat auction identifier", "tender identifier", "tenderer identifier", "tender time", "tender money value" and "tender type".

The accounting system 7 provides a payment method for a successful bidder, e.g., permits the successful bidder to select a payment method, including the use of a credit card, a bank money transfer, and cash on delivery. The accounting process is performed using the selected payment method, and when the price has been paid, a payment complete status is set. The accounting system 7 includes an accounting gateway 17.

The ticket delivery system 8 permits a successful bidder to select a ticket delivery method from several choices provided by a ticket vendor (sponsor). Example delivery methods can be delivery by mail, delivery at a convenience store, delivery at the counter of a ticket sales place, delivery at a hall, or distribution using a digital ticket. When the payment process is completed, a ticket is delivered to a successful bidder, and the delivery complete status is set. The ticket delivery system 8 includes a ticket transmission gateway 18, and when a digital ticket is to be issued, it also includes a digital ticket gateway 19.

The accounting gateway 17, the ticket transmission gateway 18 and the digital ticket gateway 19 refer to a successful bid database 23. A record 27 for the successful bid database 23 includes, for example, "successful bid identifier", "successful bidder identifier", "name and address", "payment method", "contact method", "accounting state" and "ticket transmission state".

An explanation will now be given for an auction method using the above auction system. FIG. 2 is a flowchart showing an example auction method according to the embodiment. In FIG. 2, the process performed by a ticket purchase applicant (the process performed by the computer 2) is shown on the left, and the process performed by a ticket vender (the process performed by the server 3) is shown on the right.

First, a ticket purchase applicant (purchaser) issues a request for a search for an exhibition (step 30). This request is, for example, an HTTP request. It is natural for the request to include, as a variable, a search key, such as an exhibition name.

Then, upon receiving the search request, the ticket vendor performs the search process and transmits the search results (exhibition data) (step 31). The transmitted data is, for example, dynamic HTML data, and is displayed using an appropriate browser by the computer system 2 of the purchaser. The search process is performed by the exhibition search engine 9 while referring to the exhibition database 20. A well-known method is used for the search process.

The purchaser who has received the search results confirms a target exhibition by examining the displayed exhibition data (step 32), and issues a request for a tender screen (step 33). When, for example, a list of exhibitions found by the search is displayed, the request for the tender screen can be issued by forming a link to each list entry and by clicking on the list entry to designate the linking destination. Predetermined tender screen data are stored at each linking destination, and the server 3 that received the screen request returns the tender screen data (step 34).

The tender screen data includes the seating table data, and the seating table is displayed on the tender screen presented by the computer system 2 of the purchaser. Thus, the purchaser can offer a tender while confirming the seating table (step 35).

FIG. 3 is a diagram showing an example screen for a seating table and tenders. To clearly show the tender period, the tender start time and the tender end time are displayed at the top of the screen, and the seating table is displayed in the upper half of the screen. In the seating table, column numbers, such as C 1 and C 5, and row numbers, such as R 4 and R 5, are displayed and seat numbers are clearly shown. Further, the current tender condition is displayed for each seat. When there is a seat for which no value is displayed, that indicates that no tender has been submitted for that seat, while for a seat for which a tender has been submitted, the tender type (a personal tender, an incomplete group tender or a complete group tender) and the current highest tender price are displayed. In FIG. 3, tender types are represented by using gray scale levels, and actually, different display patterns, such as different colors and shading, can be employed. In addition, the highest tender price is indicated using numerals. While the range of the seats for which tenders have been received for an incomplete group is represented by double frames, and the range of the seats for which tenders have been received for a complete group is represented by a single frame.

The lower left portion in FIG. 3 is a tender data input portion. A tender is submitted by entering a seat number and a tender price, and the purchase type, either a personal, a complete group or an incomplete group tender, is also designated. In the example in FIG. 3, a personal tender of 2200 yen is offered for the seat R 6, C 16. In the lower right portion in FIG. 3, the current highest tender price, the display type and the range for a complete or an incomplete group tender are displayed as reference information.

While referring to the display screen, the purchaser can submit a tender for a seat position and a price in accordance with an individual determination. In this embodiment, the view of a stage from a seat can be simulated. For example, a purchaser can issue a request for a seat simulation by, for example, clicking on a specific seat in the seating table in FIG. 3 (step 36). This request includes as a variable the data for the seat position. The server 3 receives the request and calculates the seat simulation using the seat simulator 11, and returns the obtained seat simulation data to the computer system 2 (step 37), which then displays the received seat simulation data on the screen (step 38). FIG. 4 is a diagram showing an example seat simulation screen. In FIG. 4, the simulation results shown are for a view of the stage is viewed from the center on the second floor. Not only the view of the stage, but also a head 70 of an audience member on the fist floor and a head 71 of an audience member in the seat immediate in front are displayed. By referring to the simulation results, the purchaser can correctly determine the value of the seat.

In this embodiment, the provided seat information is not limited to a simulation of the view, and information can also be provided, for example, as to whether the seat is appropriate for a user in a wheelchair. Since such information is provided, the opportunity to attend an exhibition, such as a concert, is provided for a user in a wheelchair, and accessibility is improved. As another information example, preference information, the offering of a profit such as a price discount, for example, to avoid dead stock can also be provided.

In this embodiment, an abundance of data is presented on the tender screen and its accompanying screen. As a result, a purchaser can refer to these data to determine the correct value for a desired seat. Then, the auction can be held based on prices that purchasers can correctly evaluate, and a maximum profit can be obtained by a vendor.

The purchaser submits a tender by designating a seat position, a tender price and a tender type in the above described manner (step 39). The tender is submitted by entering data in the above predetermined fields and by, for example, depressing a transmission key (enter key).

Upon the reception of the tender data, the server 3 transmits a tender confirmation to the purchaser (step 40). A check is then performed to determine whether the tender period has expired (step 42). When the tender period has expired, the acceptance of tenders is closed, and a successful bidder is determined (step 43). When the tender period has not yet expired, program control waits until the end of the tender period (step 42). During this waiting period, other tenders are sequentially accumulated.

FIG. 5 is a flowchart showing the successful bid determination method (step 43). The successful bid determination process is performed for each seat. First, a check is performed to determine whether there is a next seat (step 81). When there is a next seat, program control advances to step 83, or when no next seat is present, the successful bid determination process is terminated (step 82).

At step 83, a check is performed to determine whether the purchase type of the highest price tenderer for the seat is a personal tender or an incomplete group tender. When the purchase type of the highest price tenderer is a personal tender or an incomplete group tender, the highest price tenderer is determined to be the successful bidder for the seat (step 84), and program control returns to step 81. When the purchase type of the highest price tenderer is neither a personal tender nor an incomplete group tender, i.e., the purchase type is a complete group tender, a check is performed to determine whether the other members of the complete group are outbid (step 85). When the other members of the complete group are outbid, the bids can not be successful for all the members of the group. Thus, the tenders (including the successful bid) offered by the members of the complete group are abandoned, i.e., it is assumed that no tenders were offered (step 87), and program control returns to step 81. When there is no outbid among the other members of the complete group, the tenderer for the seat is determined to be a successful bidder (step 86), and program control returns to step 81. It should be noted that, when an outbid occurs for the other members of a complete group, a successful bid may be canceled.

As is described above, in this embodiment, once the tender was submitted (the bid was successful), the successful bid may be canceled for the complete group. This is the feature that differs from other auction methods. When a tender is canceled after a successful bid is determined, the determination for the purchase of the seat is performed through the process beginning at step 81.

The notification of the results, i.e., the thus determined successful bidder and the other tenderers whose bids are not successful (outbid), is transmitted by e-mail (step 44). This notification is received by the purchase applicants (step 45), and at the same time, the accounting process is performed for the successful bidder (step 46). When the accounting process has completed normally, the ticket delivery process is performed (step 47). The purchaser receives the ticket, and the process sequence is terminated (step 48).

According to the embodiment, since the auction is held by using the Internet, a ticket purchase applicant can participate in the auction at an arbitrary time. Further, while referring to the table and, as needed, more detailed information, such as the seat simulation, the purchase applicant can submit a tender. Therefore, the purchase applicant can determine the correct value for a seat, and may obtain a ticket at a price consonant with the value. When a higher tender price is presented, the price competition can be performed based on the principle of free competition. These determinations can be submitted to the purchasers, so that the fair competition principle is guaranteed and the value of a seat can be entrusted to the market economy. As a result, a vendor and a promoter can efficiently present an exhibition while obtaining the highest possible profit, and the chance that so-called scalping will interfere can be removed. That is, a fair profit can be returned to the correct recipients.

In addition, in this embodiment, since the tender type is a personal, a complete group or an incomplete group, services for users can be provided in detail. That is, the need of a user for the purchase of a ticket to be canceled when the seats for all the members are not available can be coped with.

Furthermore, in this embodiment, since information convenient for a user in a wheelchair can be displayed as well as the seating table, the barriers encountered by a handicapped person or an elderly person when that person desires to attend an exhibition can be reduced, and accessibility for all can be improved.

The present invention has been specially explained by referring to the embodiment; however, the present invention is not limited to this embodiment, and can be variously modified without departing from the scope of the invention.

For example, as is shown in FIG. 6, the highest tender price is set in advance, and a person who has offered the highest price can be determined to be the successful bidder even before the tender period has expired. FIG. 6 is a flowchart showing an auction method according to another embodiment of the present invention. In FIG. 6, since the steps before tenders are submitted are the same as those in the above embodiment, these steps are not shown. Following the submission of a tender (step 39), the server receives the tender data (step 91), and determines whether the tendered money value is equal to or higher than the highest value (step 92). When the decision is Yes, the bid for the seat is successful (step 93), and successful bid e-mail is transmitted (step 94). At the same time, the accounting process is performed (step 95), and the ticket delivery process is performed (step 96). The other processes are the same as those in the above embodiment. In this case, since the highest tender price is determined in advance, an abnormal rise in the tendered price can be prevented.

In this embodiment, a tender can be offered for each of the seats; however, in this case, individually tendered prices may vary greatly, and when a great difference occurs in the prices for adjacent seats, purchasers by be unfairly affected. In this case, a so-called Dutch auction may be performed for a set of multiple seats, so that the variance of the prices of the seats can be reduced. Furthermore, the highest price for multiple seats (one unit) can be set in advance.

In the embodiment, the auction has been performed for seats at a hall, such as a concert hall; however, the present invention is not limited to seats in a concert hall. The present invention can also be applied for the purchase of a flight ticket, a reserved seat ticket for a train, such as the Shinkansen, a seat in a restaurant or a room in a hotel. While the present invention can be applied for reservations for any kind of seats or rooms, the present invention is especially effective when it is applied when the value can be correctly determined by providing information about the local atmosphere by using an image.

ADVANTAGE OF THE INVENTION

The typical effects obtained by the invention are as follows. For all ticket purchasers, obtaining tickets will be much more convenient, since the invention makes possible the removal of numerous irksome inconveniences, such as having to stand in line at a ticket counter for an extended period of time or having to make repeated calls to obtain a reservation. Further, the system, as provided, will prevent certain illegal activities, such as scalping tickets, and a fair profit will be returned to the proper parties. Also, the prices of the reserved seat tickets that are sold will reflect the differing needs of individual users, and thus, promoters and ticket vendors will be able to realize maximum profits. Further, at the time a ticket is purchased, more pertinent seating information will be available, so that a purchaser will be able to easily determine the value of the seats that are offered. In addition, the information that is furnished will contribute to improved accessibility for wheelchair users, for example, and will promote the participation of physically challenged and elderly persons in social activities.

DESCRIPTION OF THE SYMBOLS

Figure 1:
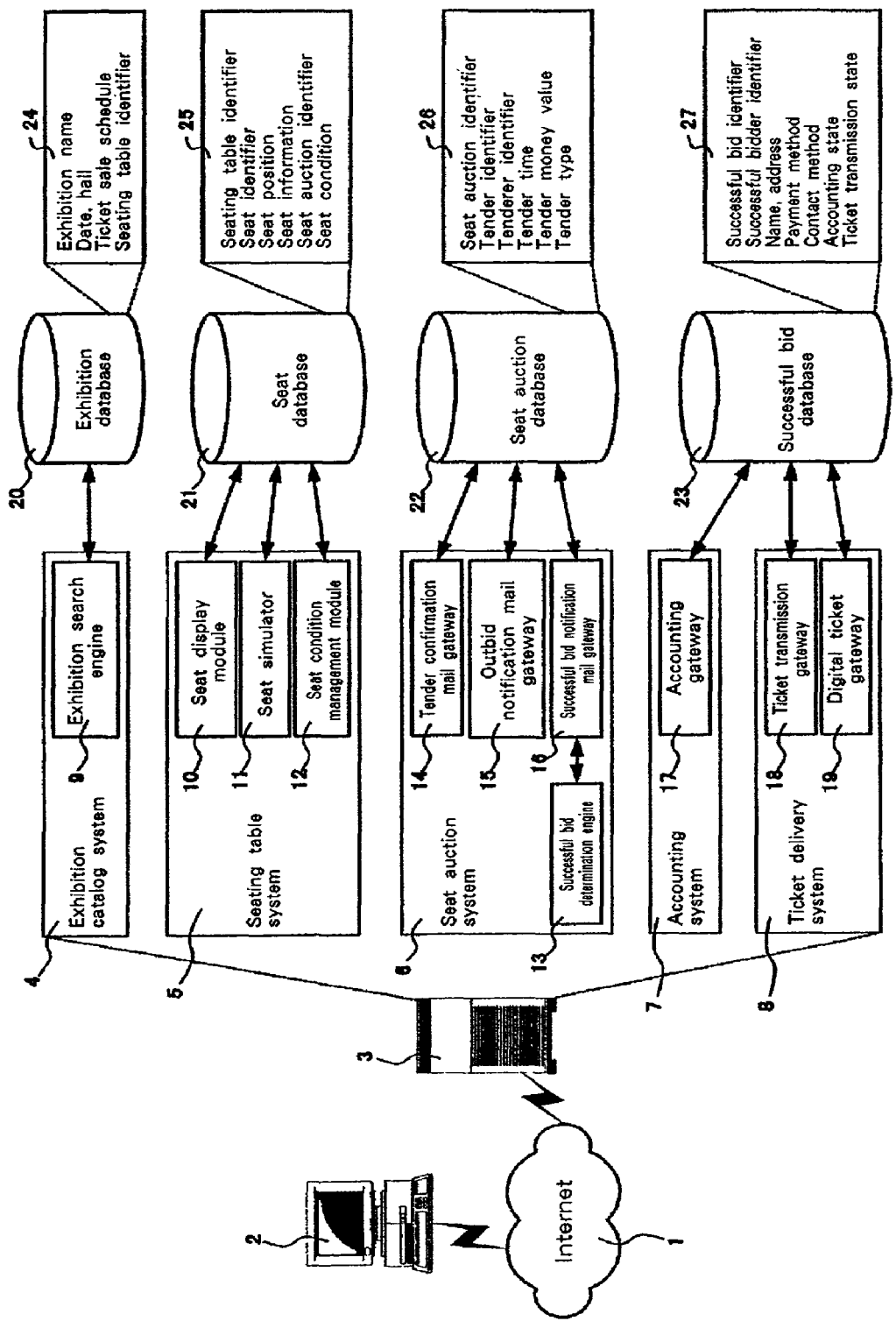
FIG. 1 is a conceptual diagram showing an example auction system according to one embodiment of the present invention.
Figure 2:
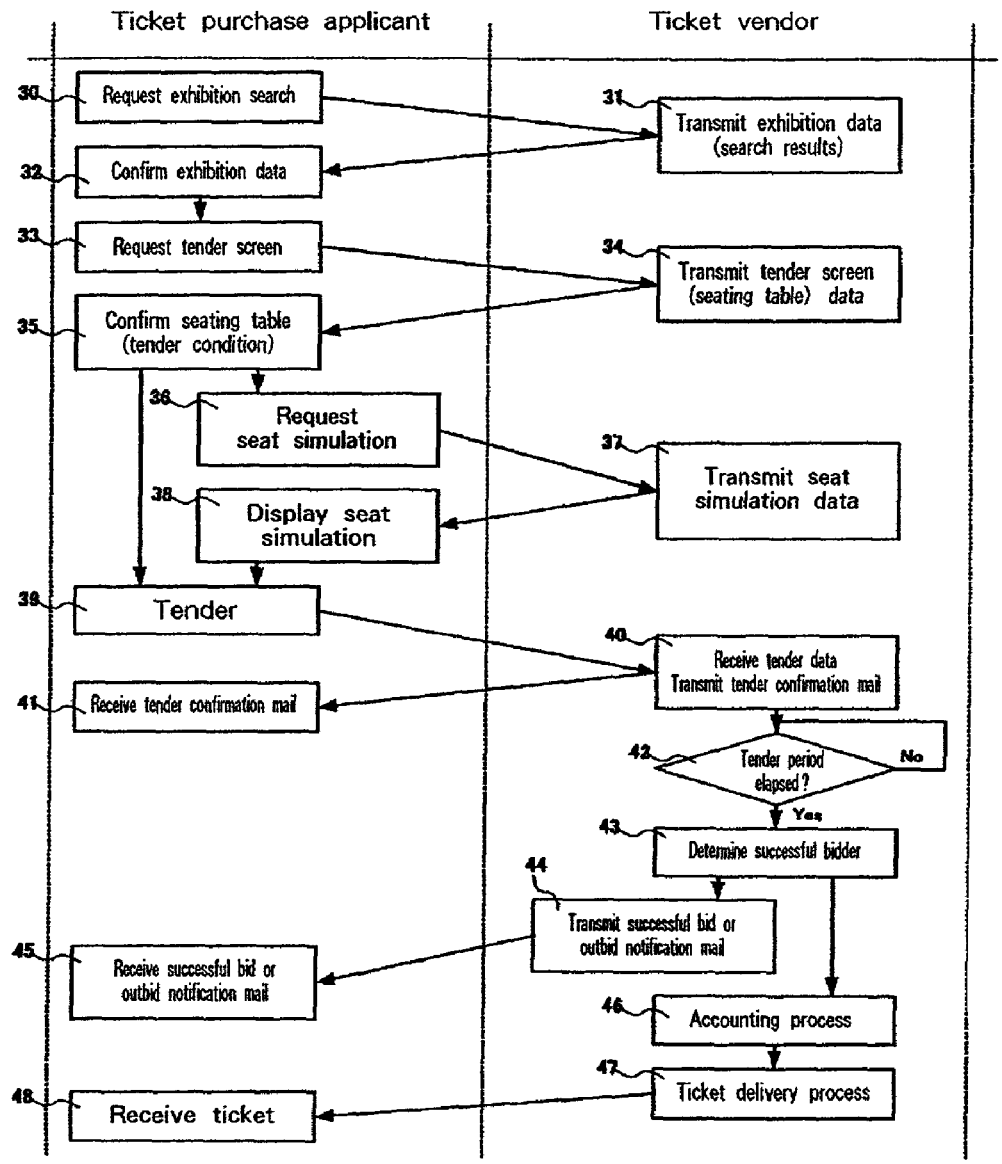
FIG. 2 is a flowchart showing an example auction method according to the embodiment of the present invention.
Figure 3:
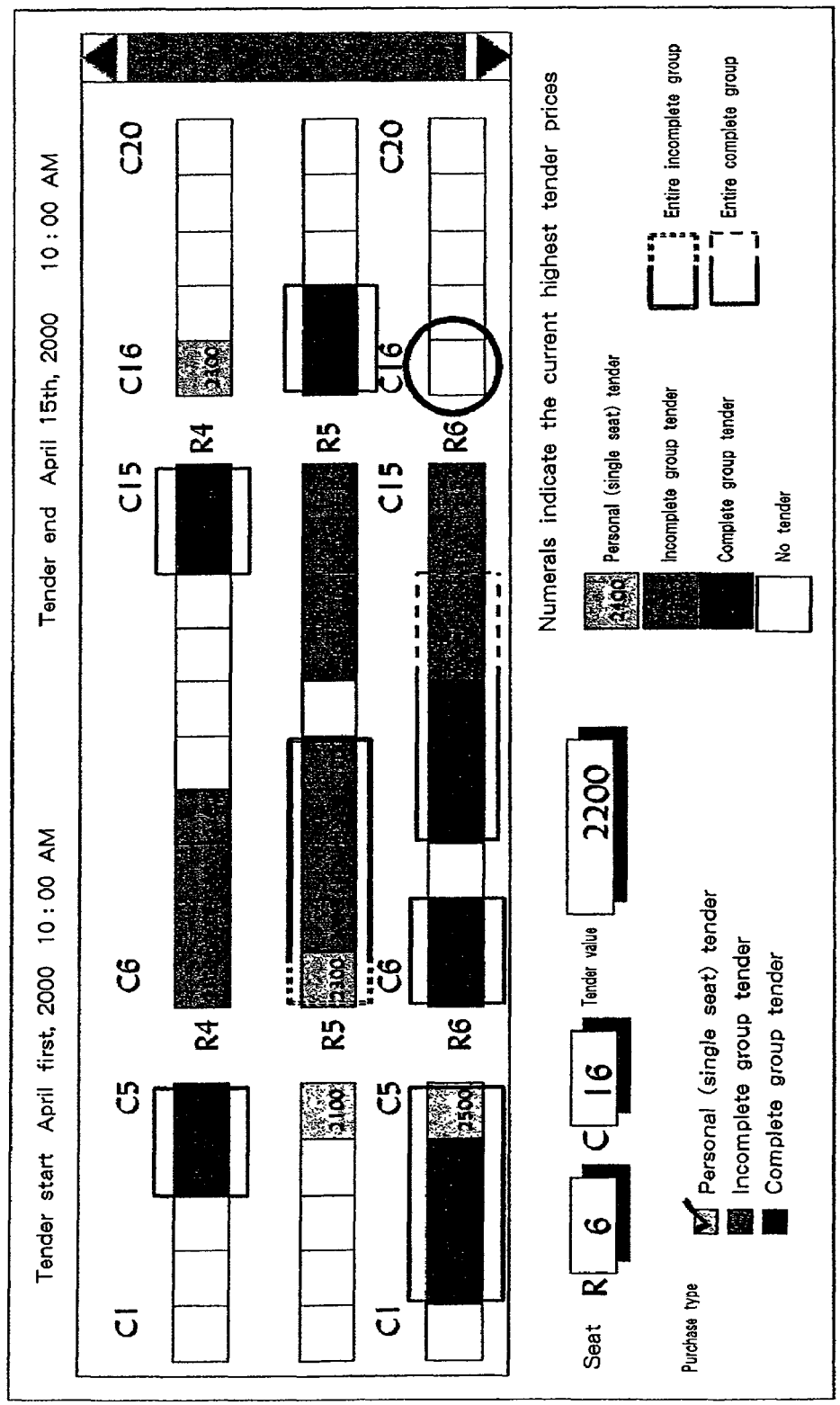
FIG. 3 is a diagram showing an example screen for a seating table and tender data.
Figure 4:
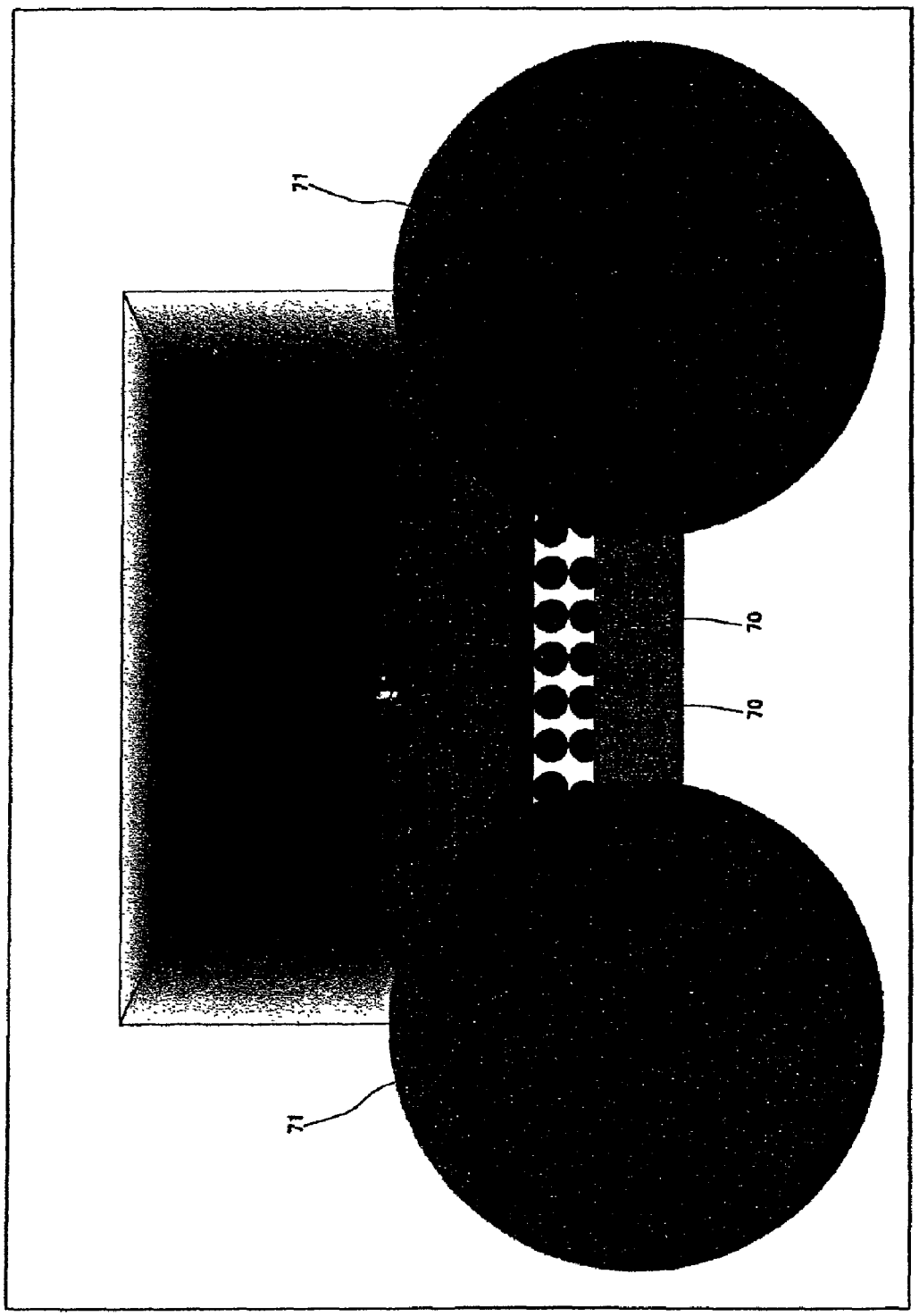
FIG. 4 is a diagram showing an example seat simulation screen.
Figure 5:
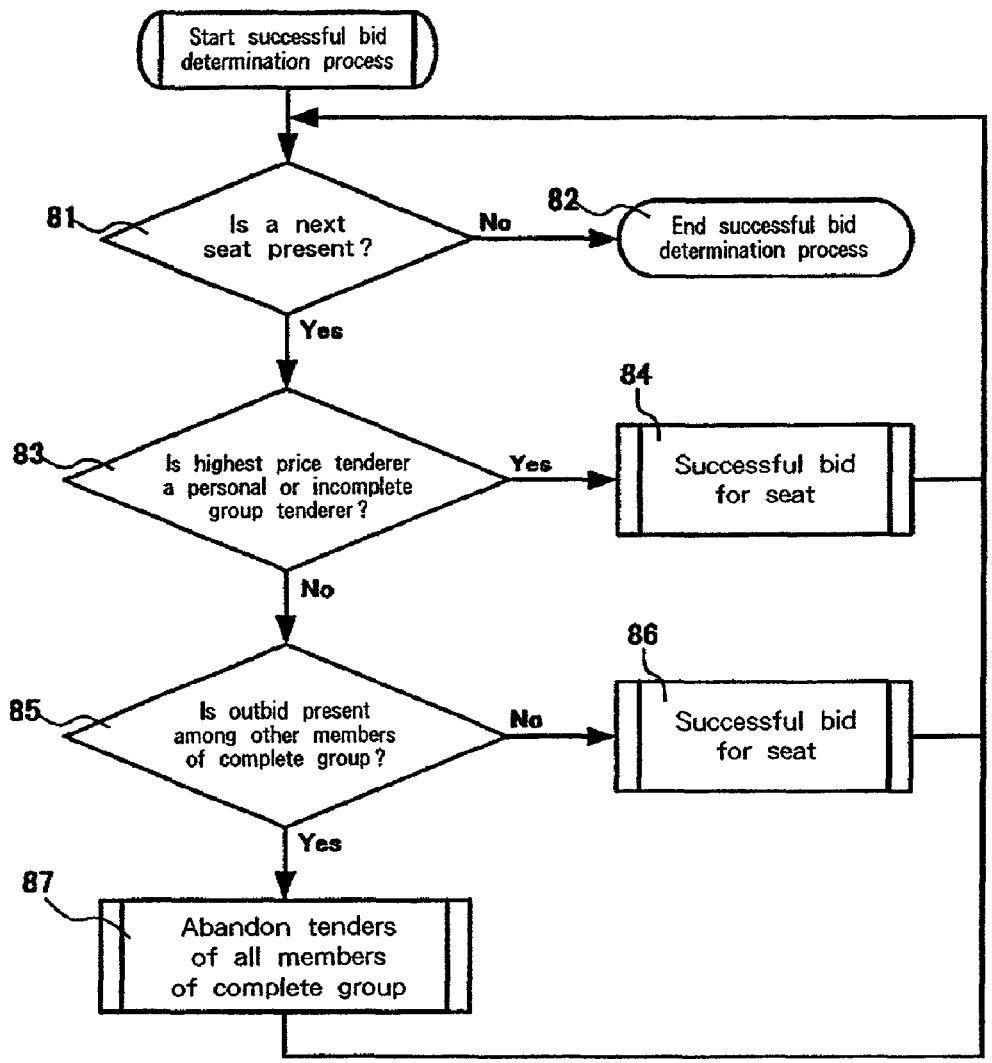
FIG. 5 is a flowchart showing an example successful bid determination method (step 43).
Figure 6:
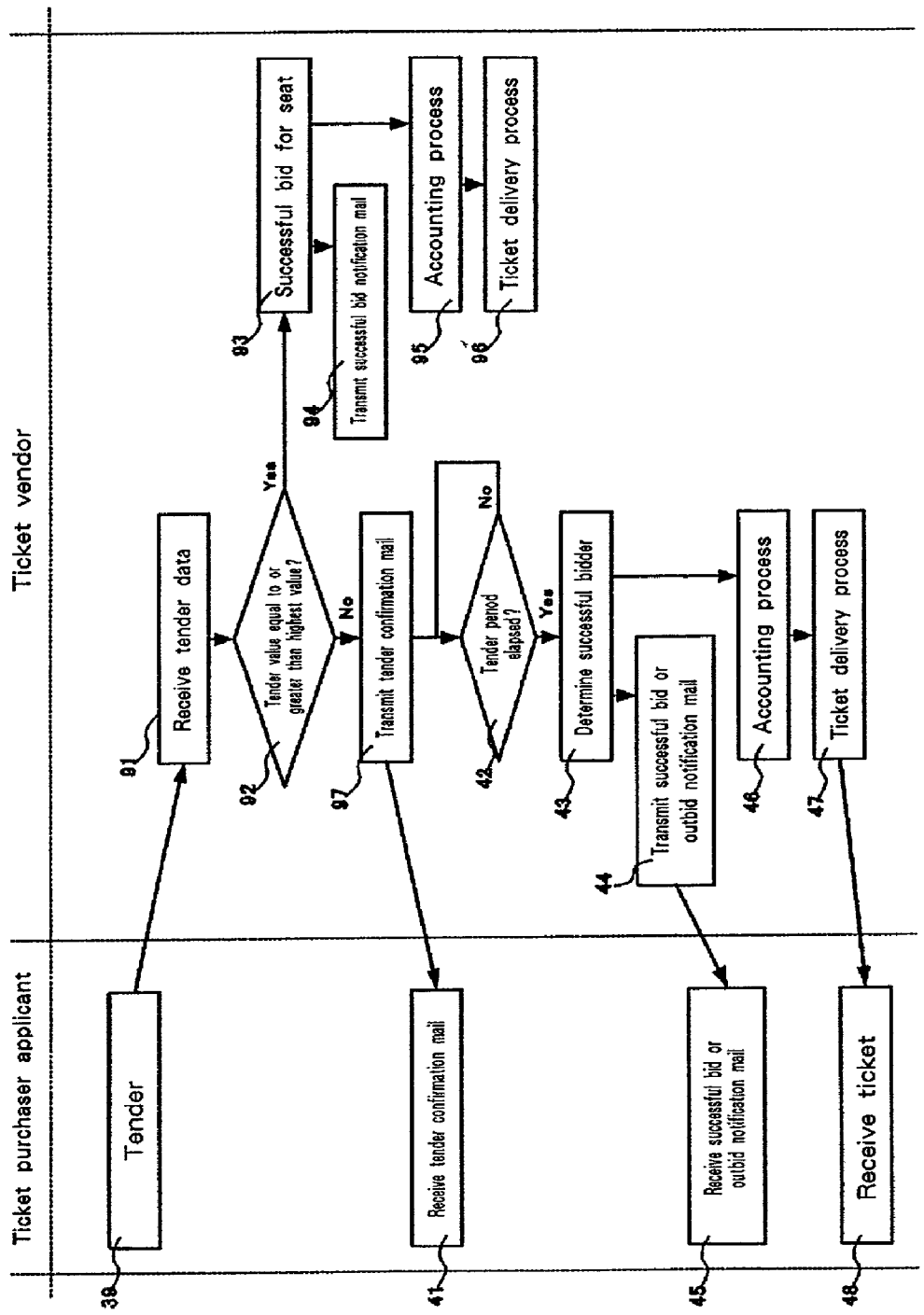
FIG. 6 is a flowchart showing an example auction method according to another embodiment of the present invention.

1: Internet
2: Computer system
3: Server
4: Exhibition catalog system
5: Seating table system
6: Seat auction system
7: Accounting system
8: Ticket delivery system
9: Exhibition search engine
10: Seat display module
11: Seat simulator
12: Seat condition management module
13: Successful bid determination engine
14: Tender confirmation mail gateway
15: Outbid notification mail gateway
16: Successful bid notification mail gateway
17: Accounting gateway
18: Ticket transmission gateway
19: Digital ticket gateway
20: Exhibition database
21: Seat database
22: Seat auction database
23: Successful bid database
70 , 71: Head

The invention claimed is:
1. An auction method comprising the steps of:
transmitting data of a tender screen, by a server computer system, in response to a request from a purchase applicant to bid for a seat ticket, said tender screen including a seating table associated with tendering conditions of seats, the tendering conditions including collective offer for seats;
receiving, by the server computer system, based upon said tendering conditions, tender data input to said tender screen;
determining, by the server computer system, a successful bidder in accordance with a single or multiple sets of said tender data;
wherein said tender data includes one of three tender types, a personal tender, a tender from a complete group, and a tender from an incomplete group, and wherein said step of determining said successful bidder includes:
a first determination step of determining, by the server computer system, whether the tender type of a highest tenderer is said personal or said tender from said incomplete group;
a step of, on condition that said first determination is true, determining, by the server computer system, that said highest tenderer is a successful bidder;
a second determination step of, on condition that said first determination is false, determining, by the server computer system, whether each member of said complete group is a non-successful bidder;
and a step of, of condition that said second determination is true, abandoning, by the server computer system, a tender for all the members of said complete group.
2. An auction system for a seat ticket comprising:
a seating table computer or processor that generates a seating table associated with tender conditions for seats and that transmits a tender screen data including said seating table, in response to a request from a purchase applicant for said seat ticket to a computer system of said purchase applicant, the tendering condition including collective offer for seats;

a seat auction computer or processor that receives tender data input based on the tendering conditions by using said tender screen, and that determines a successful bidder in accordance with a single or multiple sets of said tender data;

wherein said tender data includes one of three tender types, a personal tender, a tender from a complete group, and a tender from an incomplete group; wherein the seat auction computer or processor performs a first test to determine whether the tender type of a highest tenderer is said personal tender or said tender from said incomplete group, and performs a second test to determine whether a member of said complete group is a non-successful bidder; and wherein, if the first test is true, said highest tenderer is determined to be a successful bidder, and if the first test is false, the second test is performed, and if the second test is true, a tender is abandoned for all the members of said complete group.

* * * * *